Patented Sept. 8, 1953

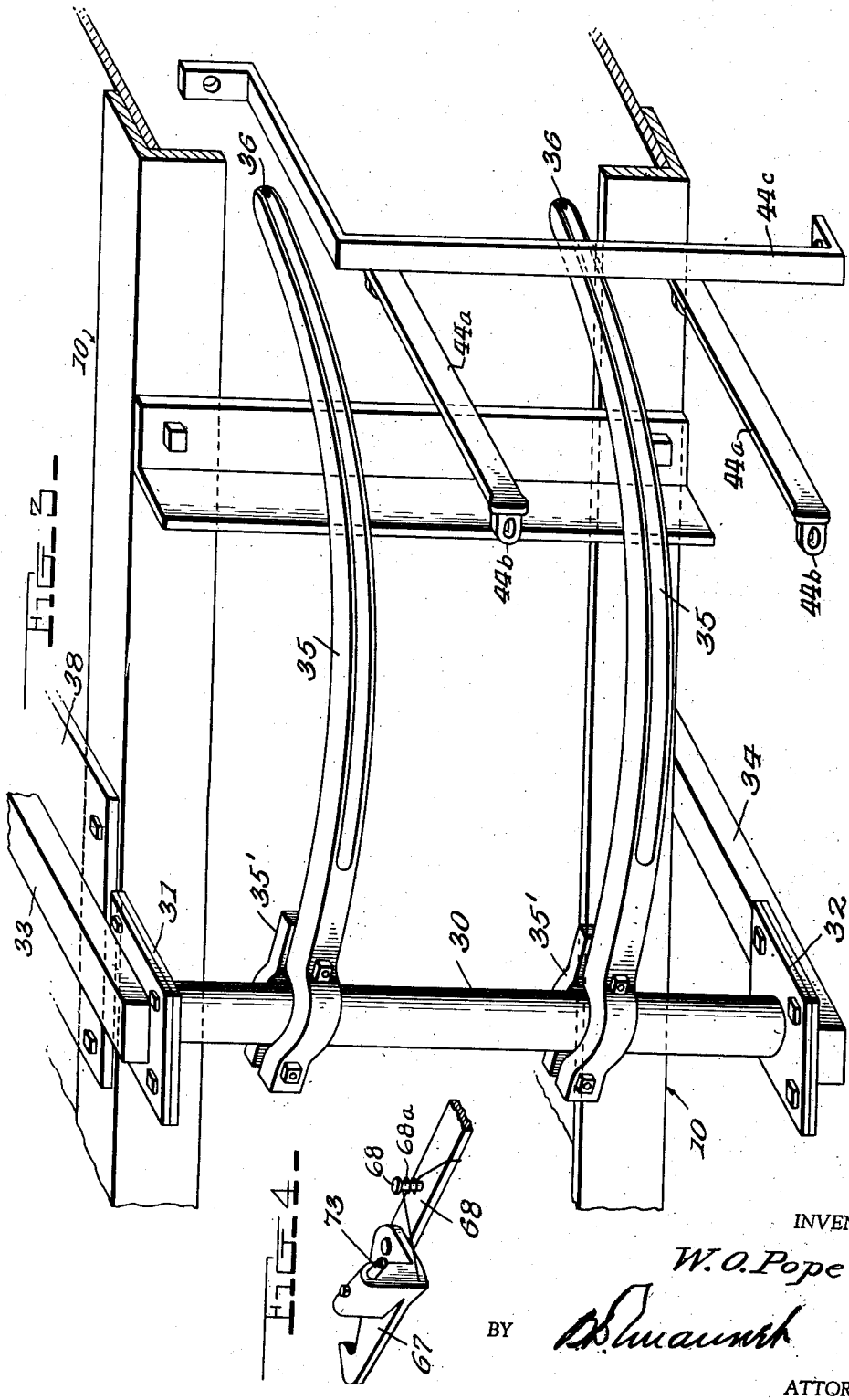

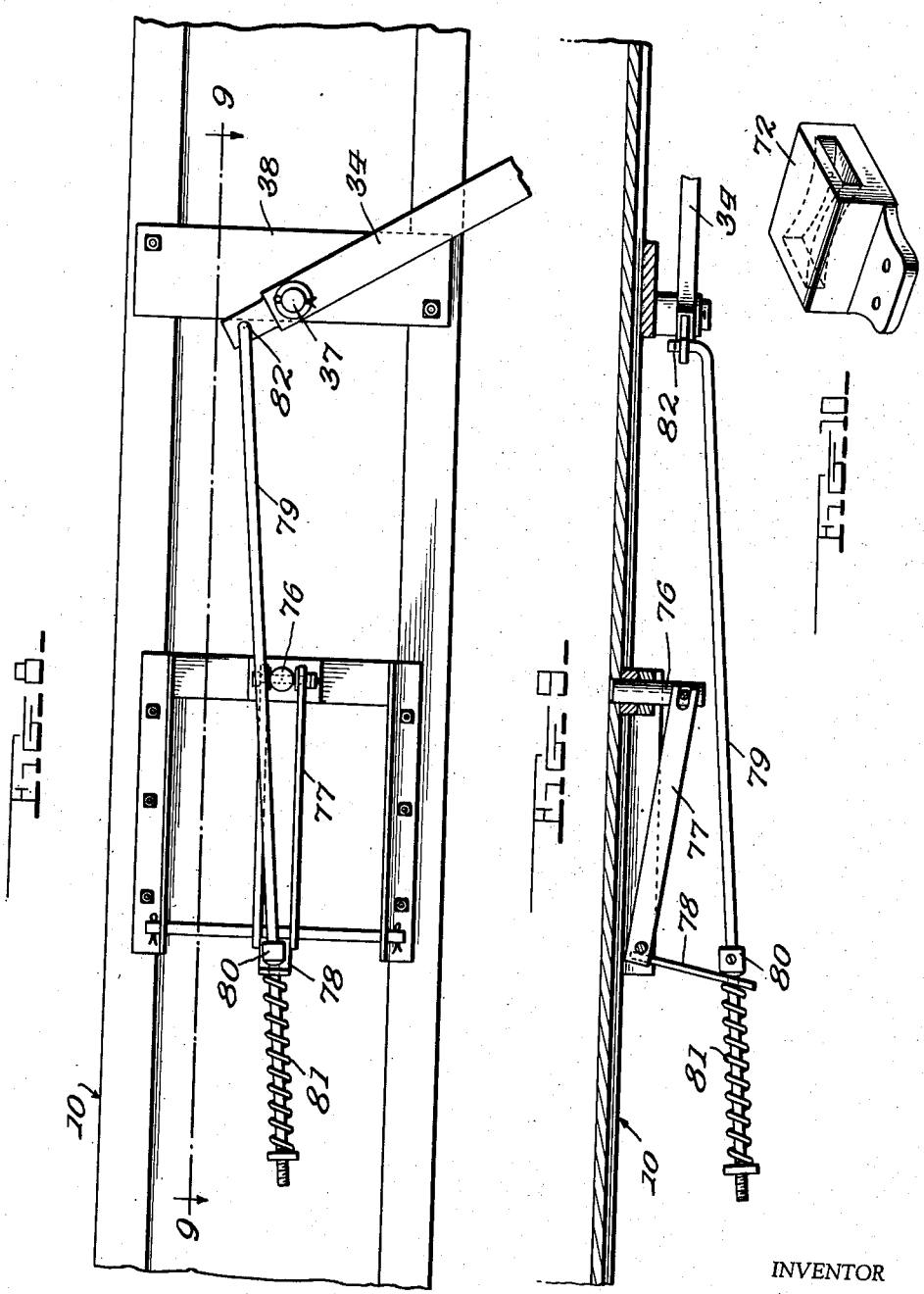

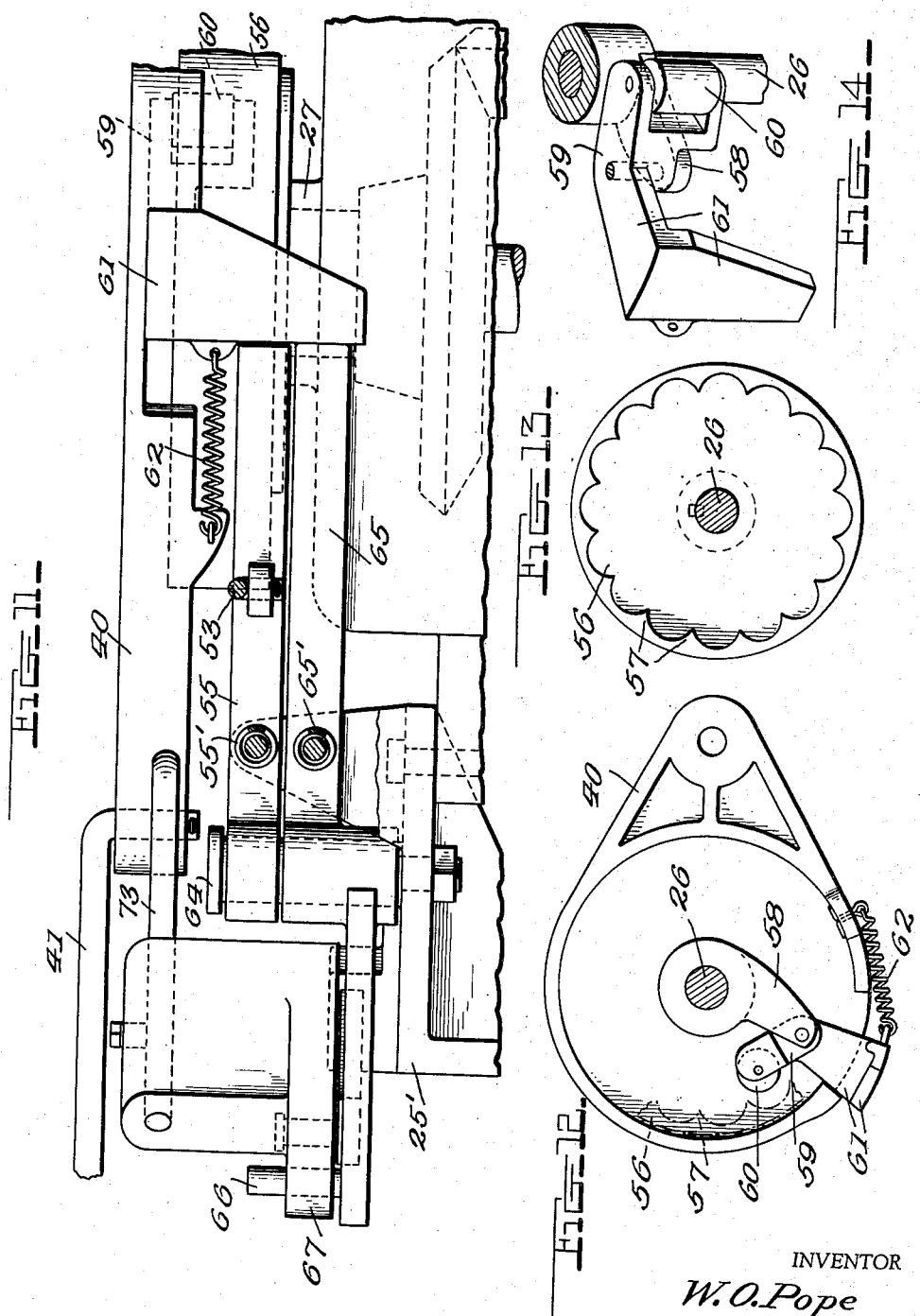

2,651,252

UNITED STATES PATENT OFFICE 2,651,252

AUTOMATIC BINDER FOR HAY BALERS

William O. Pope, Greenfield, Ind.

Application November 21, 1950, Serial No. 196,741

6 Claims. (Cl. 100—4)

This invention relates to balers such as are used to produce bales of hay and other materials, such bales being bound around with twine, rope or other flexible fibrous strands.

More particularly the invention relates to an automobile bale binder attachment for hay balers.

One important object of this invention is to provide a novel device capable of being applied to a horizontal hay baler of standard type to effect binding of twine around a bale during its formation.

Another important object of the invention is to provide novel means to hold twine in bale binding manner in such position for a suitable knotting of the twine.

A further object of the invention is to provide such an attachment with novel means controlling the sizing of the bale being produced.

Yet another object of this invention is to provide a novel attachment for a hay baler wherein the attachment parts will operate in timed relation to the bale forming elements of the hay baler to which the attachment is applied.

A still further object of the invention is to provide a novel attachment for hay balers wherein the attachment is arranged with means to prevent injury of the operator of the baler.

With the above and other objects in view as will be presently apparent, the invention consists in general of certain novel details of construction and combinations of parts hereinafter fully described, illustrated in the drawings and particularly claimed.

In the accompanying drawings like characters of reference indicate like parts in the several views, and:

Figure 3 is a fragmentary perspective view of other parts of the device located on the left side of the baler.

Figure 4 is a perspective view of a certain latching device used herein.

Figure 5 is a perspective view of a form of bracket used in a certain part of this invention.

Figure 6 is a perspective view of a rocking lever used herein to control and coordinate the action of related parts of this invention.

Figure 7 is a perspective view of a cross shaft for certain of the elements herein.

Figure 8 is a fragmentary bottom plan showing in elevation part of the mechanism on the bottom of the baler.

Figure 9 is a section on the line 9—9 of Figure 8.

Figure 10 is a perspective view of a certain guide bracket for one of the reciprocating parts of this device.

Figure 11 is an enlarged transverse section on line 11—11 of Figure 1.

Figure 12 is a bottom plan showing the arrangement of the pawl parts of the intermittently operating cam of this device.

Figure 13 is a top view of the ratchet used with the pawl of Figure 12.

Figure 14 is a perspective detail of certain cam operated elements forming parts thereof.

Figure 1:
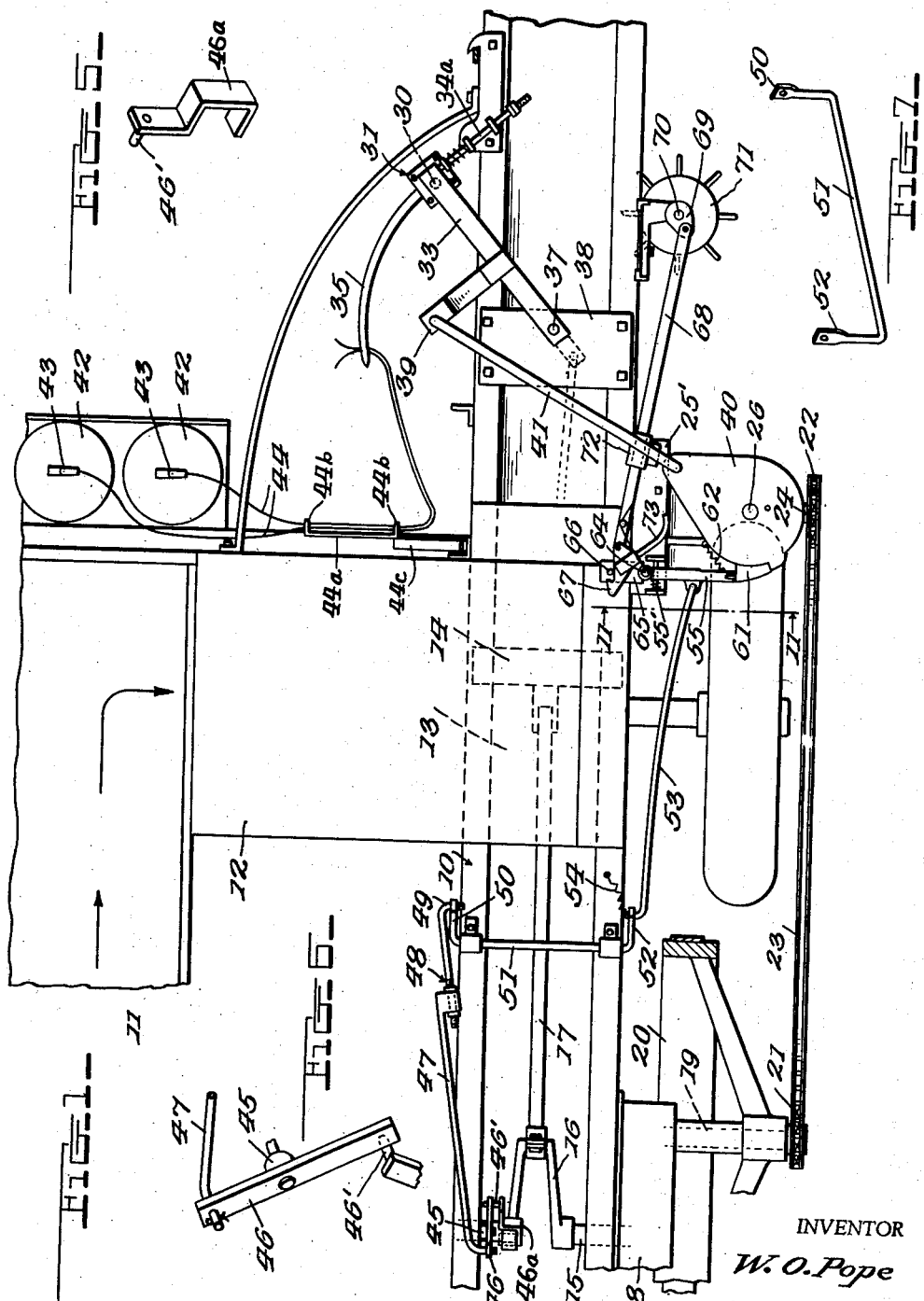
Figure 1 is a fragmentary plan view of a hay baler showing the attachment of this invention as applied thereto.

As shown in the drawings, this invention is applied to an ordinary type of field traveling hay baler wherein there is provided a frame 10 mounted on ground wheels and which frame constitutes the body of the baler with its surrounding walls. The baler picks up, as it travels through the field, the material to be baled at 11 and it is transferred by a transfer device, not shown in detail, 12, to a baling chamber 13. In this baling chamber reciprocates a plunger 14 which is the means for effecting compression of the material to be baled. Mounted on the frame 10 is a shaft 15 having a crank 16 disposed substantially central of its length and this crank is connected to the plunger 14 by a pitman 17 so that at each revolution of the shaft the plunger travels forwardly and backwardly in the chamber. In a gearing casing 18, the arrangement of which is not shown, is gearing connecting a shaft 19 with the shaft 15 and on the shaft 19 is mounted a flywheel 20. On the shaft 19 is likewise mounted a sprocket 21 which is connected to a sprocket 22 by a chain 23 so that as the shaft 15 revolves the sprocket 22 will be driven. The sprocket 22 is mounted on a shaft 24.

Considering now that one looks from the crankshaft toward the baling chamber, it is to be understood that there is a left side and a right side of the baler. The sprockets 21 and 22 and the chain 23 are thus on the right side of the baler.

Projecting from the right side of the baler are a lower bracket 25 and an upper bracket 25' which support a vertical shaft 26 in suitable bearings 27. On this shaft is fixed, near its upper end, a bevel gear 28, while on the shaft 24 is fixed a bevel gear 29 which meshes with the gear 28. Consequently the revolution of the shaft 15 causes revolution of the shaft 26.

At the left side of the baler there is a vertical shaft 30 which is secured at 31 and 32 to upper and lower arms 33 and 34. At 35 there is shown a pair of arcuate needles having strand openings 36 at their extremities. These needles are fixed by clamps 35' to the shaft 30. The needles are fixed in such position that, as shown in Figure 1, they will swing in one direction of movement across the baling chamber as the arms 33 and 34 are swung. These arms 33 and 34 are pivotally mounted at 37 on plates 38 extending transversely of the baler, the pivots 37 being centrally of the width of the baler. The free ends of the arms 33 and 34 are spring-seated at 34ª as shown in Figure 1. From the upper arm 33 a lateral arm 39 extends. Mounted on the upper end of the shaft 26 is a crank arm 40 which is normally free on the shaft 26 and this crank arm is connected by a pitman 41 with the arm 39 so that upon revolution of the crank arm 40 the needles will be swung from the position shown in Figure 1 across the baling chamber (see Figure 2) for one-half of the revolution of the crank 40 and then turned to the position shown in Figure 1. At 42 are cans containing balls of the strands or cords to be used and these cans are provided with outlets 43 at their tops wherethrough strands 44 pass through the eyes of the needles 35. In passing from the cans 42 the strands are led through arms 44ª having at their ends guides 44ᵇ, the arms being supported by a suitable bracket 44ᶜ. Thus the operation of the curved needles causes such strands to pass across the baling chamber.

The operation of the needles must be effected intermittently and therefore must take place when the plunger 14 has completed its compression stroke. To this end there is provided on the left side of the frame 10 a bracket 45 whereon is carried a rocker arm 46. This rocker arm 46 is operated by a tappet pin 46' carried by a bracket 46ª on the shaft 15, when the plunger 14 completes its working stroke. The rocker arm 46 is connected by a link 47 with an adjusting device 48 for the purpose of regulating the throw due to the rocker arm. This adjusting device terminates in an offset 49 engaging in the crank arm 50 of a cross shaft 51 which extends entirely across the baler and terminates in a second rocker arm 52. The rocker arm 52 has connected thereto a link 53. A spring 54 normally urges the rocker arm 52 against the action of the link 47. On one of the brackets 25' is pivoted one end of an arm 55 and midway of the length of this arm the link 53 is pivotally connected.

Keyed to the top of the shaft 26 is a ratchet member 56 having internal ratchet teeth 57. The crank arm 40, at its lower side, is provided with a lateral lug 58 and pivoted to this lug is a rocker 59 which carries a roller 60 adapted to engage at the spaces between the teeth 57 and thus constitutes a pawl. The inner end portion of the crank arm 40 is of hollow cylindrical form and is notched at one side to provide exit means for the arm 61 of the rocker 59, and a spring 62 connects this end of the crank arm with the member 40 in such manner as to urge the roller 60 into pawl engagement with the ratchet whenever arm 61 is freed for such movement. The arm 55 is swingably mounted on the bracket 25' and moves by the revolution of the shaft 15 into and out of engagement with the arm 61 so that when in one position it will free said arm 61 and permit engagement of the roller 60 with the ratchet. The arm 55 is pivoted at 64 and on this same pivot there is a lower swingable arm 65 as best seen in Figure 11. The member 65 carries a pin 66 cooperable with a pivoted latch 67 on a link 68. A pin 68' carried by the link 68 and a coil spring 68ª cooperating with the pin 68', link 68 and latch 67, operates to maintain the latch 67 in operative position. This link connects with a crank 69 on a shaft 70 which supports a spur wheel 71 which projects into the side of the bale being formed and is driven by said bale. A bracket 72 is provided for guiding the link 68. The latch member 67 is provided with a manually operable trip arm 73 cooperable with the crank arm 40. Both arms 55 and 65 are urged to normal position by springs 55' and 65'.

Figure 2:
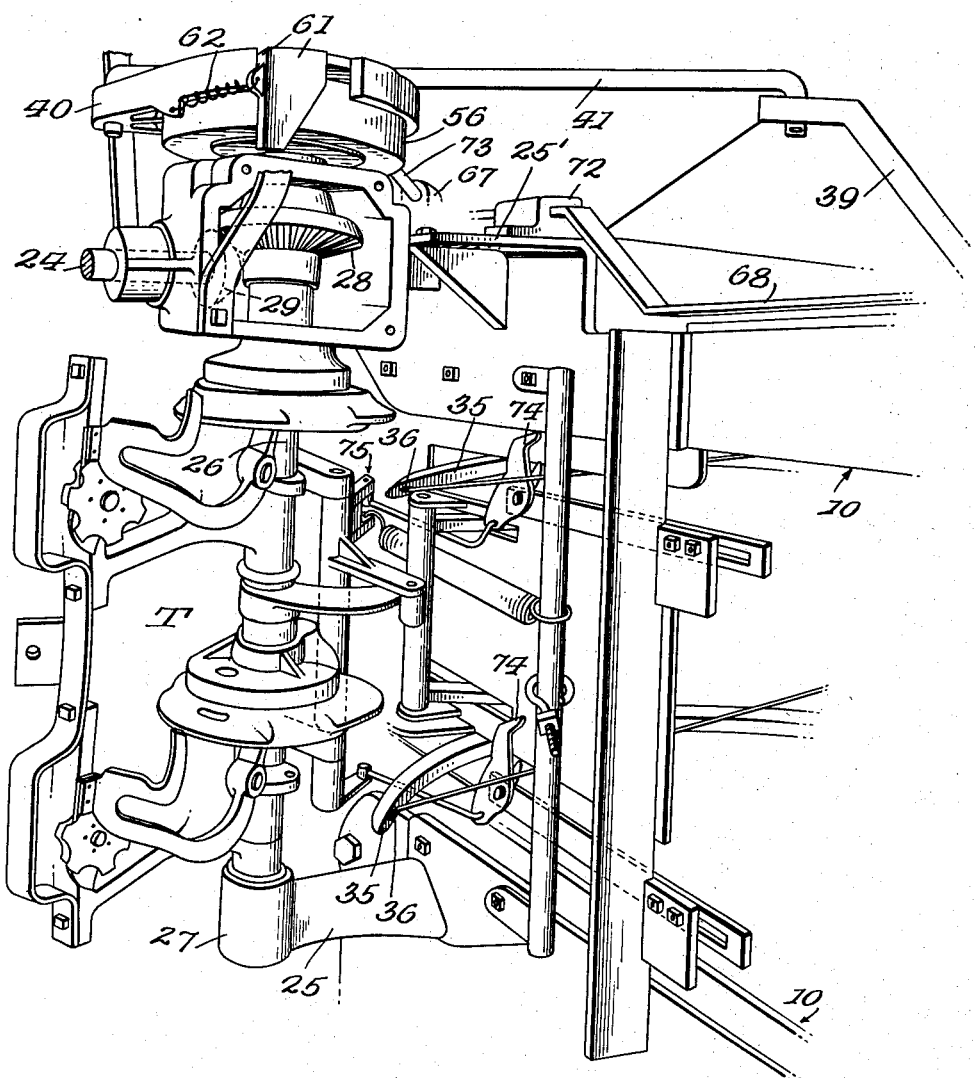
Figure 2 is a perspective view showing certain parts of the attachment which are located on the right or fly-wheel side of the baler.

It will now be seen that with the revolution of the baler crank shaft the needles will be operated back and forth across the baling chamber and when they have been projected across the baling chamber provision is made for gripping the strands, this provision being shown in Figure 2 by the tilting fingers 74 which are actuated by a cam device 75 so that each time the fingers are in proper position the members 74 are tilted and grip the strands 44.

In Figures 8 and 9 is shown a safety mechanism for arresting movement of the plunger 14 should the machine get out of time. There is provided a plunger pin 76 mounted on an arm 77 from which projects an arm 78. Through the arm 78 extends a rod 79 carrying a stop 80 between which and the spring 81 said arm 78 extends. This rod 79 is connected at 82 with the arm 34 above described. Thus, the pin 76 is projected into the baling chamber in timed relation with needle movement, as a safety precaution to arrest the movement of the plunger 14 should the needles 35 fail to retract in time, due to some mechanical failure.

In the operation of the device as the baler shaft revolves the plunger 14 moves to and from and compresses the material to be baled. It is to be understood that there is already in the baling chamber a bound and tied bale so that this bale forms the abutment against which the next bale is compressed. Now with each revolution of the crank shaft of the baler all material received in the baling chamber is compressed against the preceding bale and at the same time assuming that the baling head or plunger has completed the compression the pawl and ratchet mechanism connects the constantly revolving baler shaft and the vertical shaft to the right of the machine. This causes immediate swinging of the needles across the formed end of the bale and carries the strands thereacross. These strands are then gripped by the holding members while the needles are quickly retracted. At this point in the operation a suitable tying device, not being necessary here to be described, but which is illustrated at T in Figure 2, comes into play and ties the strands while at the same time cutting them, thus leaving the bale in tightly bound condition ready for the next action of the baling head or plunger. The wheel 71 determines the length of the bales and operates the link 68 carrying the latch 67, whereby this latch is at the proper time engaged with the pin 66. Then, as movement of the link 68 starts in the other direction (to the right in Figure 1), the latch and pin coact to swing the lower member 65 from engagement with the arm 61 of the rocker 59. At this time, or shortly thereafter, the upper member 55 will be released by the link 53 and associated elements (when the plunger 14 completes its stroke). Consequently, the spring 62 then acts to swing the rocker 59, engaging the roller 60 with the teeth 57 and starting the needle operating and bale tying cycle. When the required rotation of the crank arm 40 is about completed, said crank arm engages the latch release arm 73, releasing the latch 67 from the pin 66 and freeing the arm 65 from connection with said links. This allows the spring 65' to return the arm 65 to normal position in the path of the arm 61 of the rocker 59. Consequently, this arm 61 will then strike the arm 65 and rock the rocker 59 to disengage the roller 60 from the teeth 57, stopping the cycle.

From the above detailed description of the invention, it is believed that the construction, operation, and use thereof will at once be apparent, and while there is herein shown and described the preferred embodiment of the invention, it is nevertheless to be understood that minor changes may be made therein without departing from the spirit and scope of the invention as claimed.

What is claimed, is:

1. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said branch arm, said crank arm having an arcuate flange extending concentric to said second vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses, a bell-crank pawl lever pivoted within the crank arm eccentric to the second vertical shaft, a roller on one end of the lever movable into and out of said recesses, the other arm of said bell-crank lever extending through said gap, and means controlled by the revolution of the baler crank shaft intermittently causing engagement of the pawl and ratchet.

2. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said branch arm, gearing connecting said crank shaft and said last mentioned shaft, said crank arm having an arcuate flange extending concentric to said second vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses, a bell crank pawl lever pivoted within the crank arm eccentric to the second vertical shaft, a roller on one end of the lever movable into and out of said recesses, the other arm of said bell crank lever extending through said gap, and means controlled by the revolution of the baler crank shaft intermittently causing engagement of the pawl and ratchet.

3. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said fixed arm, a ratchet disk fixed on the last mentioned shaft to revolve therewith, said crank arm having an arcuate flange extending concentric to said vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses, a bell crank pawl lever pivoted within the crank arm eccentric to the second vertical shaft, a roller on one end of the lever movable into and out of said recesses, the other arm of said bell crank lever extending through said gap, and means controlled by the revolution of the baler crank shaft intermittently causing engagement of the pawl and ratchet, and pawl disengaging means including a latching device, a bale sizing wheel carried by the baling machine, and a latch releasing member actuated from said wheel.

4. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said fixed arm, gearing connecting said crank shaft and said last mentioned shaft, said crank arm having an arcuate flange extending concentric to said second vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses a bell crank pawl lever pivoted within the crank arm eccentric to the second vertical shaft a roller on one end of the lever movable into and out of said recesses the other arm of said bell crank lever extending through said gap, means controlled by the revolution of the baler crank shaft intermittently causing engagement of the pawl and ratchet, said last means including a latching device normally engaging the last mentioned arm of the bell crank lever, means for releasing the pawl from the action of the crank shaft including a bale sizing wheel carried by the baling machine, and a latch releasing member actuated from said wheel.

5. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said fixed arm, said crank arm having an arcuate flange extending concentric to said second vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses, a bell crank pawl lever pivoted within the crank arm eccentric to the second vertical shaft, a roller on one end of the lever movable into and out of said recesses, the other arm of said bell crank lever extending through said gap, means controlled by the revolution of the baler crank shaft intermittently causing engagement of the pawl and ratchet, said last means including a latching device normally engaging the last mentioned arm of the bell crank lever, means for releasing the pawl from the action of the crank shaft including a bale sizing wheel carried by the baling machine, a latch releasing member actuated from said wheel, and manually operable means for releasing said latching device.

6. The combination with a horizontal baling machine having a baling chamber, a crank shaft, a plunger head, and a pitman connecting the head with the crank of said shaft; of a bale wrapping and securing means including arcuate strand carrying needles carried by the baler at one side of said chamber and mounted for oscillatory movement across said chamber, operating means for said needles mounted on the opposite side of said chamber, said needle mounting including a vertical shaft and an arm having one end fixed to and extending laterally from the shaft and having its other end pivotally supported, said arm having a branch arm extending laterally from a point between its ends, said operating means including a second vertical shaft having a crank arm extending revolubly therefrom and a link connecting said crank arm and said fixed arm, gearing connecting said crank shaft and said last mentioned shaft, said crank arm having an arcuate flange extending concentric to said second vertical shaft and having opposed ends forming a gap, a ratchet consisting of a disk fixed on said second vertical shaft and provided with a peripheral flange fitting within the crank arm flange, said peripheral flange having its interior face provided with a continuous series of arcuate recesses, a bell crank pawl lever pivoted within the crank arm eccentric to the second vertical shaft, a roller on one end of the lever movable into and out of said recesses, the other arm of said bell crank lever extending through said gap, means controlled by the revolution of the baler crank shaft intermittently causing engagement of the pawl and ratchet, said last means including a latching device normally engaging the last mentioned arm of the bell crank lever, means for releasing the pawl from the action of the crank shaft including a bale sizing wheel carried by the baling machine, a latch releasing member actuated from said wheel, and manually operable means for releasing said latching device.

WILLIAM O. POPE.

References Cited in the file of this patent

UNITED STATES PATENTS

| Number | Name | Date |
| --- | --- | --- |
| 764,318 | Towner | July 5, 1904 |
| 1,158,654 | Dudley | Nov. 2, 1915 |
| 1,205,980 | Dudley | Nov. 28, 1916 |
| 1,369,612 | Bowers | Feb. 22, 1921 |
| 1,769,331 | Burkholder | July 1, 1930 |
| 2,484,890 | Hill | Oct. 18, 1949 |
| 2,516,445 | Barnhill | July 25, 1950 |
| 2,551,873 | Burford | May 8, 1951 |